United States Patent
Mayr et al.

(10) Patent No.: US 9,556,968 B2
(45) Date of Patent: Jan. 31, 2017

(54) ELECTROMAGNETIC ACTUATOR AND FLUID VALVE WITH SUCH AN ACTUATOR

(71) Applicant: ZF Friedrichshafen AG, Friedrichshafen (DE)

(72) Inventors: Karlheinz Mayr, Bregenz (AT); Markus Moosmann, Grünkraut (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 167 days.

(21) Appl. No.: 14/326,800

(22) Filed: Jul. 9, 2014

(65) Prior Publication Data

US 2015/0014560 A1    Jan. 15, 2015

(30) Foreign Application Priority Data

Jul. 12, 2013    (DE) .................. 10 2013 213 712

(51) Int. Cl.
*F16K 31/06* (2006.01)
*H01F 7/06* (2006.01)
*F16K 1/54* (2006.01)

(52) U.S. Cl.
CPC .............. *F16K 31/06* (2013.01); *F16K 1/54* (2013.01); *F16K 31/0634* (2013.01);
(Continued)

(58) Field of Classification Search
CPC .... F16K 31/06; F16K 31/0613; F16K 31/062; F16K 31/0624; F16K 31/0627; F16K 31/0631; F16K 31/0634; F16K 31/0637; F16K 31/0675; F16K 1/54; H01F 7/06; H01F 7/08; H01F 7/081; H01F 7/083; H01F 7/086; H01F 7/126
(Continued)

(56) References Cited

U.S. PATENT DOCUMENTS 4,452,424 A * 6/1984 Kawata ............... F16K 31/0648
137/625.33
6,467,754 B2 * 10/2002 Bircann ............. F02M 25/0772
251/129.15

(Continued)

FOREIGN PATENT DOCUMENTS

DE    10 2010 026 135 A1    1/2012

OTHER PUBLICATIONS

German Patent Office Search Report, Jan. 7, 2014.

*Primary Examiner* — William McCalister
*Assistant Examiner* — Ian Paquette
(74) *Attorney, Agent, or Firm* — Dority & Manning, P.A.

(57) ABSTRACT

An electromagnetic actuator with at least one solenoid coil, one armature, which is magnetically movable by means of the solenoid coil in an armature area and has a first and a second tapering, and a magnetic yoke. The yoke has a first dipping stage in which the first tapering of the armature is dipped upon a shifting of the armature in a direction of actuation, and a second dipping stage in which the second tapering of the armature is dipped upon a shifting of the armature in the direction of actuation. A maximum radial external dimension of the armature in the area of the second tapering is smaller than a minimum radial internal dimension of the second dipping stage. In addition, the invention refers to a fluid valve that is actuated by means of the electromagnetic actuator.

11 Claims, 4 Drawing Sheets

(52) U.S. Cl.
CPC ...... *F16K 31/0637* (2013.01); *F16K 31/0675* (2013.01); *H01F 7/06* (2013.01)

(58) Field of Classification Search
USPC ........................................ 251/129.15, 129.02
See application file for complete search history.

(56) References Cited

U.S. PATENT DOCUMENTS

| | | |
|---|---|---|
| 6,827,331 B1 | 12/2004 | Roos |
| 6,989,729 B2 | 1/2006 | Mayr et al. |
| 7,370,669 B2 | 5/2008 | Urya et al. |
| 7,516,756 B2 | 4/2009 | Mayr et al. |
| 8,701,707 B2 | 4/2014 | Moosmann et al. |
| 2003/0037825 A1* | 2/2003 | Runge ................ G05D 16/2013 137/596.17 |
| 2005/0099256 A1* | 5/2005 | Subramanian ...... F16K 31/0637 335/256 |
| 2010/0276022 A1* | 11/2010 | Moosmann ............. F16D 48/02 137/613 |
| 2011/0115587 A1* | 5/2011 | Ishibashi ................ H01F 7/081 335/255 |
| 2012/0298893 A1 | 11/2012 | Scherer et al. |
| 2012/0298898 A1 | 11/2012 | Scherer et al. |
| 2013/0153801 A1 | 6/2013 | Sato et al. |
| 2014/0150908 A1 | 6/2014 | Mayr et al. |

* cited by examiner

ELECTROMAGNETIC ACTUATOR AND FLUID VALVE WITH SUCH AN ACTUATOR

FIELD OF THE INVENTION

The invention relates to an electromagnetic actuator, in particular for the actuation of a fluid valve, as well as a fluid valve with such an actuator.

BACKGROUND

With multi-stage vehicle automatic transmissions and automatic vehicle manual transmissions known from conventional use, hydraulic shifting elements designed as clutches or brakes are used for inserting different transmission stages of the transmission. In this process, for changing or inserting a desired transmission stage of the transmission, the hydraulic shifting elements are pressurized or vented with fluid pressure (fluid pressure is relieved). Fluid valves, in particular pressure control valves, are used for this purpose.

The current standard fluid valves for vehicle transmissions, for example, that which is disclosed in WO 2005/026858 A1, has two poppet valves interconnected at a hydraulic half-bridge circuit. Such a fluid valve has an inlet opening and two outlet openings, whereas, in terms of flow engineering, a first part valve is arranged between the inlet opening and the first outlet opening, and a second part valve is arranged between the first outlet opening and the second outlet opening. Thereby, the part valves are mechanically coupled in such a manner that the part valves alternately close or open. A single electromagnetic actuator is used for the actuation of the part valves.

Equipping such a fluid valve with a flow control device is known from WO 2009/092488 A1. The valve is provided with several channel areas, such that the fluid flowing in the direction of the second part valve is brought into a swirl. Thereby, the second part valve is designed as a cone poppet valve. Here as well, a single electromagnetic actuator is used for the actuation of the part valves.

The fluid valves known from these two documents are so-called "proportional pressure control valves." In operation, such valves are set to a desired fluid pressure p at one of the outlet openings (to the working pressure connection), whereas such fluid pressure is essentially dependent in a proportional manner on an electric current I, which is supplied to the electromagnetic actuator. Thus, on the basis of the supplied electric current I, the desired fluid pressure p may be directly preset. As such, a p/I characteristic curve of such a proportional pressure control valve is essentially line-shaped in the normal operating range; i.e., the output fluid pressure p there is proportional to the supplied electric current I.

However, in some situations, such a purely proportional manner of operation is not advantageous. This is especially the case when, on the one hand, a fluid valve is to be set at low fluid pressures with a very high accuracy, and on the other hand high fluid pressures are to be made available. For precision control of a low fluid pressure, fluid valves require a very flat p/I characteristic curve, as current fluctuations thereby only slightly affect the output fluid pressure. In order to then set a proportional pressure control valve at a high fluid pressure, given the flat p/I characteristic curve, a very large electric current is necessary, which is possibly not available.

Fluid valves with a progressive p/I characteristic curve are known. Their p/I characteristic curve is relatively flat at low fluid pressures/currents (relatively low inclination) and relatively steep at increased fluid pressures/currents (relatively high inclination). Therefore, the p/I characteristic curve for such valves is not line-shaped, or is only partially line-shaped. Thereby, both a more precise setting of low fluid pressures, and a provision of higher fluid pressures, is possible.

A fluid valve with a progressive characteristic curve can be taken from, for example, DE 102 55 414 A1. For the production of the progressive characteristic curve, the electromagnetic actuator provided there, which serves the purpose of actuating the valve, has a two-part solenoid armature, whereas the armature parts are pushed away from each other by means of a spring. A complex assembly of the electromagnetic actuator, and thus the fluid valve, arises from the many individual parts of the solenoid armature, An electromagnetic actuator is also known from DE 199 53 788 A1; with this, a disproportionately large force is achieved in an end position of the armature, by providing two pole faces on one magnetic yoke of the actuator, with each pole face interacting in succession with a tapering (cone-shaped surface of the armature) for the generation of the actuating force of the actuator. Thereby, the first of the pole faces is provided in an interior space radially enclosed by a solenoid coil of the actuator, and the second of the pole faces is provided outside of this interior space.

The travel path of such electromagnetic actuator is restricted by the second pole face, since it is located in the armature's direction of movement. In addition, a significant interaction between the second pole face and the armature can be achieved at a point that is very late, almost at the end of the travel path of the actuator, since only at that point have the armature and the second pole face sufficiently converged (the air gap between them is then sufficiently reduced). The actuating force path characteristic curve of the actuator correspondingly increases in a progressive manner for the first time at the end of the maximum possible travel path (see FIG. 3 of DE 199 53 788 A1: the actuation here takes place from right to left; i.e., the armature moves in the direction of actuation from s>0 to s=0).

SUMMARY OF THE INVENTION

Therefore, a task of the invention is to provide an electromagnetic actuator that enables a greater travel path and an early progressive increase in the actuating force generated by the actuator. It is also a task of the invention to provide a fluid valve with a progressive characteristic curve, which is easily built. Additional objects and advantages of the invention will be set forth in part in the following description, or may be obvious from the description, or may be learned through practice of the invention.

The tasks are solved with an electromagnetic actuator with the characteristics of the appended claims, and with a fluid valve with such an actuator.

Accordingly, an electromagnetic actuator, in particular for the actuation of a fluid valve, is proposed having at least one solenoid coil, one armature magnetically movable by means of the solenoid coil in an armature area. The armature has at least one first and one second tapering, along with one magnetic yoke.

The magnetic yoke has at least one first dipping stage, in which the first tapering of the armature is dipped upon a shifting of the armature in a direction of actuation, and a second dipping stage, in which the second tapering of the armature is dipped upon a shifting of the armature in the direction of actuation. In doing so, the first dipping stage extends from a first front side of the solenoid coil into the armature area, and the first dipping stage operates in conjunction with the first tapering of the armature with an electrical power supply of the solenoid coil for generating the actuating force of the actuator. In addition, the second dipping stage extends from a second front side of the solenoid coil into the armature area, and the second dipping stage operates in conjunction with the second tapering of the armature with an electric power supply of the solenoid coil for generating the actuating force of the actuator.

Thereby, it is provided that a maximum radial external dimension of the armature in the area of the second tapering is smaller than a minimum radial internal dimension of the second dipping stage. In other words, the external size of the armature is smaller than the internal size of the second dipping stage, such that the armature in the direction of actuation is freely movable in respect of the second dipping stage. Thus, a larger travel path (possible path of the armature in the direction of actuation) is achievable with the actuator, since the second dipping stage is not in the travel path of the armature. This means that the armature is freely movable along the second dipping stage, likewise in the area of its maximum radial dimension.

Thereby, the term "radial" is understood in particular as essentially perpendicular to the direction of actuation, or as an axis on which the armature is movably guided in the armature area. Accordingly, the term "axial" is understood in particular as in the direction of actuation or along the axis on which the armature is movably guided in the armature area. Thereby, the taperings are arranged in particular in the direction of actuation of the actuator on the armature; i.e., a radial external dimension of the armature decreases in the direction of actuation with each of the taperings. Thereby, the direction of actuation of the actuator is in particular the direction in which the actuating force caused by means of the electric power supply of the solenoid coil and accessible at the actuator acts. The second dipping stage is radially outward in respect of the second tapering.

Through the dipping of the second tapering in the second dipping stage, an axial covering between this tapering and the dipping stage is produced, and a radial air gap between them is reduced, and minimized in particular. Thus, a magnetic flux between the armature and the magnetic yoke is enlarged, and the actuating force that is generated increases. Given that the armature is able to move along the second tapering without colliding with it, it is possible to position the second dipping stage in such a manner that the second tapering is dipped in it earlier than in the state of the art. Thus, a progressive increase in the actuating force is accordingly obtained earlier, and the actuating force path characteristic curve features a progressive increase in the actuating force relatively early.

In one arrangement of the invention, the actuator comprises exactly the specified two dipping stages, thus exactly the first and second dipping stage. However, it is alternatively conceivable that additional dipping stages for the armature are provided.

In one additional form of the invention, the first and the second dipping stages are arranged in such a manner that, upon a shifting in the direction of actuation, the armature is initially dipped with the second tapering in the second dipping stage, whereas, however, the first tapering is still outside of the first dipping stage (is not yet dipped in), and, upon a further shifting in the direction of actuation, the armature is both dipped with the second tapering deeper in the second dipping stage, and also dipped with the first tapering in the first dipping stage. Through the earlier dipping of the second tapering in the corresponding second dipping stage, a smooth progressive increase in the actuating force of the actuator is achieved. Thus, the actuating force does not increase for the first time at the end of the travel path, but earlier.

In one additional form of the invention, the armature is designed in a cylinder shape, with a maximum external diameter, and the second dipping stage is designed in a hollow cylinder shape, with a minimum internal diameter. Thereby, the maximum external diameter of the armature is smaller than the minimum internal diameter of the second dipping stage. Such armature and dipping stages can be easily produced. In one arrangement thereof, upon the dipping of the second tapering in the second dipping stage, that area of the armature that features the maximum external diameter is covered with that area of the second dipping stage that features the minimum internal diameter, in the direction of actuation (thus, axially), such that a radial gap between the armature and the second dipping stage is minimized. In the area of the second tapering, the armature is accordingly reduced from the maximum external diameter to a smaller external diameter.

As a basic principle, the first and/or the second tapering of the armature are designed in a stepped arrangement or in a cone shape. This means that one of the taperings is cone-shaped, and the other tapering is arranged in steps. With a cone-shaped tapering, the external diameter or the radial external dimension, as the case may be, steadily decreases axially, during which a tapering arranged in steps of the external diameter or the radial external dimension, as the case may be, unsteadily decreases axially, i.e. erratically.

In one additional form of the invention, the second dipping stage is located within an interior space radially enclosed by the solenoid coil. Thereby, a very compact actuator can be created, because outside of the interior space of the solenoid coil, no additional space is required for the second dipping stage. In one arrangement thereof, the second dipping stage is formed on a pole tube, which protrudes from the second front side of the solenoid coil into the interior space radially enclosed by the solenoid coil.

It should be noted that the solenoid armature of the actuator in accordance with the invention preferably consists of one part or of several parts that are firmly connected with each other, by which the solenoid armature forms a single fixed unit. However, the version of the actuator in accordance with the invention does not present a fundamental alternative to the electromagnetic actuator disclosed in DE 102 55 414 A1. This means that the actuator in accordance with the invention may, in one version, feature a two-piece solenoid armature designed in accordance with DE 102 55 414 A1, in particular an armature designed in accordance with FIG. 2 of DE 102 55 414 A1. The solenoid armature then features the two taperings, which, as described above, each work together with one of the dipping stages of the magnetic yoke. Thereby, both taperings can be provided together on one of the armature parts, or in each case one tapering can be provided on one of the armature parts.

Upon the use of the actuator to actuate a fluid valve, through the progressive course of the actuating force, a corresponding progressive course of the set fluid pressure can be achieved. Thus, the fluid pressure set by means of the fluid valve progressively runs up to the strength of the electric current fed to the actuator (progressive p/I characteristic curve).

The fluid valve comprises in particular a pressure control valve, thus a valve for controlling a certain desired fluid pressure, in particular oil pressure or hydraulic pressure, as the case may be. The fluid valve features at least one inlet opening and a first and a second outlet opening, which are able to be connected to each other in terms of flow engineering through two part valves of the fluid valve mechanically coupled to each other, which are preferably designed as poppet valves. This means that the part valves are designed in such a manner that, if there are corresponding switching positions, they connect the inlet and outlet openings with each other in a fluid-conducting manner. Thereby, by means of the first part valve, a fluid intake is adjustable from the inlet opening to the first and second outlet opening, and, by means of the second part valve, a fluid discharge is adjustable between the first and second outlet opening. During operation, the fluid quantity that flows in is adjusted accordingly by the first part valve, while the distribution of the fluid quantity that flows out between the first and second outlet opening is adjusted by the second poppet valve. Thereby, the fluid quantity that flows out and/or the fluid pressure can be selectively adjusted at the first and/or the second outlet opening.

This valve structure essentially corresponds to the fluid valves known from WO 2005/026858 A1 or WO 2009/092488 A1. However, it is now provided that the fluid valve features an electromagnetic actuator in accordance with the invention described above, and that the part valves are actuated by means of it. Thus, a progressive p/I characteristic curve of the fluid valve can be achieved without great effort. Thereby, the part valves are designed in particular as poppet valves. It can be provided that the part valves are consolidated in a common housing at a valve module, such as a cartridge valve. It can also be provided that the fluid valve has solely the two part valves, thus no additional part valves.

In an optional additional form of the fluid valve in accordance with the invention, at least the second part valve is designed as a poppet valve, with a cone-shaped closing element, whereas the closing element features several taper areas, which have varying taper angles. Thereby, the p/I characteristic of the fluid valve can be flexibly adjusted to the intended use; thus, for example, a stronger or weaker progressive slope is achieved. Through using different taper areas, with varying taper angles on the closing element, the gap between the closing element and the valve seat when opening the part valve is no longer rigidly proportional to the stroke of the closing element; rather, it can be arbitrarily adjusted through the corresponding design of the taper areas (taper angle, axial length, etc.). Such a taper angle is in particular not 0° and not 90°.

In one arrangement thereof, the second part valve features a hollow cone-shaped valve seat, on which only one taper area, or some of several taper areas, of the closing element lie flat in the closed state of the second part valve. The manufacturing of the fluid valve is thereby simplified, as it is then the case that not all taper areas need to lie flat on the valve seat; this would require very precise manufacturing tolerances (precise tools, extensive quality checks, etc.).

In one additional form of the fluid valve in accordance with the invention, one of the taper areas of the closing element features an acute taper angle, and another of the taper areas features an obtuse taper angle, such that the closing element has a concave lateral surface. Thereby, such a taper angle is in particular the angle by which the lateral surface of the respective taper area is inclined with respect to the actuation axis of the part valve, thus the axis along with the closing element moves for opening and closing the part valve. An acute taper angle exists if the closing body in this taper area is tapered in the direction of closing of the part valve, while an obtuse taper angle exists if the closing body in this taper area is expanded in the direction of closing of the part valve As a basic principle, it is possible that the fluid valve is actuated by means of a conventional proportional solenoid, instead of by means of the described electromagnetic actuator in accordance with the invention, with a progressive actuating force path characteristic curve. Thus, the part valves are then actuated (i.e., opened or closed) by means of the conventional proportional solenoid. Such a proportional solenoid likewise comprises an electromagnetic actuator, which however does not have a progressive actuating force path characteristic curve, but has an essentially proportional actuating force path characteristic curve. Such proportional solenoids are known. The adjustment of the p/I characteristic curve to the desired course, such as the progressive course, then takes place essentially solely through the corresponding design of the varying taper angle of the closing element of the second part valve.

BRIEF DESCRIPTION OF THE DRAWINGS

In the following, the invention is more specifically described based on examples and drawings, from which additional advantageous arrangements and characteristics of the invention may be derived. The following are shown, each in schematic presentation, FIG. 1 a two-dimensional longitudinal section through a proposed electromagnetic actuator.

DETAILED DESCRIPTION

Figure 1:
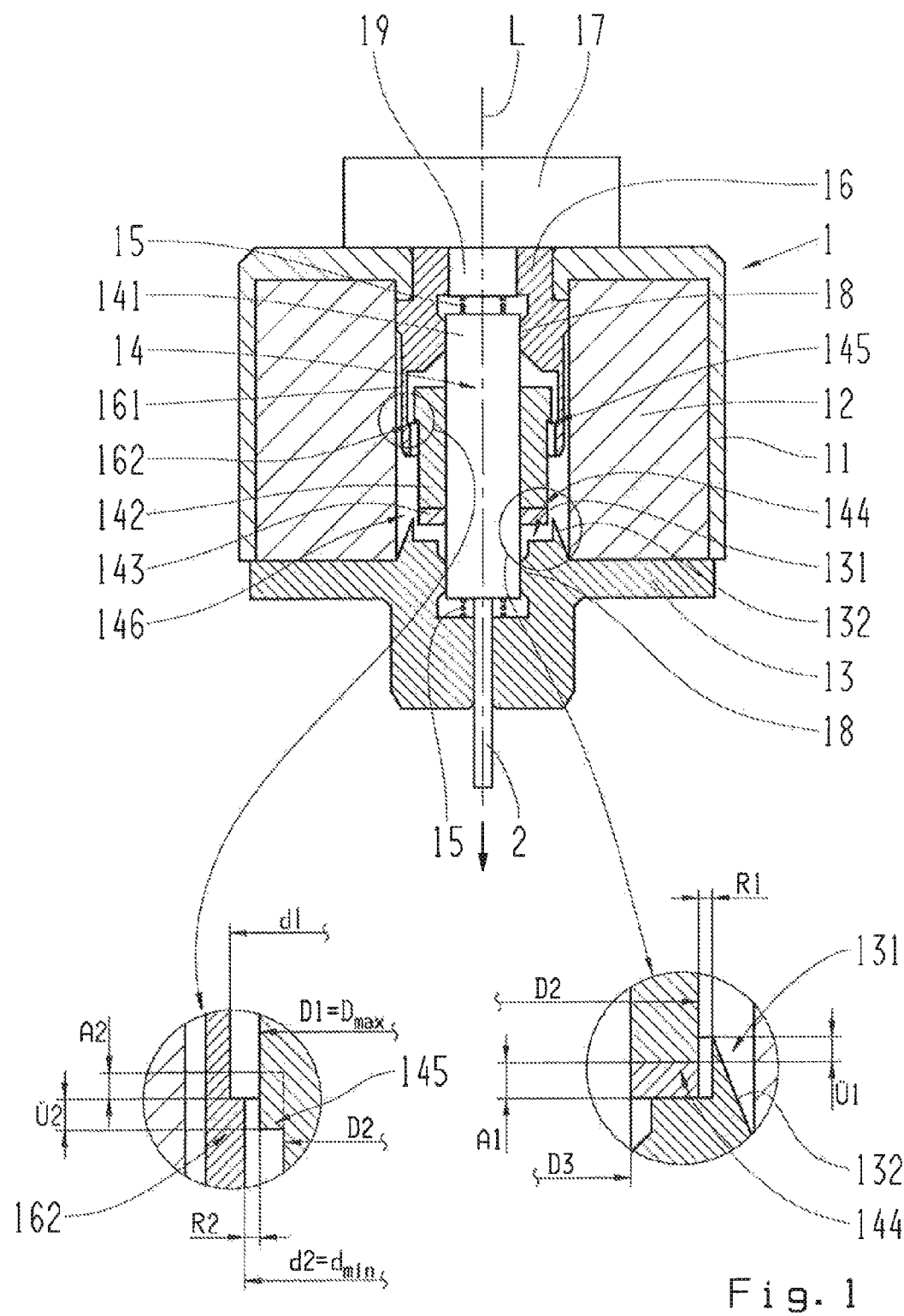

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

In the figures, equivalent or at least functionally equivalent components are provided with the same reference signs.

FIG. 1 shows a longitudinal section through an electromagnetic actuator 1 designed in accordance with the invention. This features a housing 11, a solenoid coil 12, a solenoid armature 14 and a magnetic yoke 13, 16. The first part 13 of the magnetic yoke, which is provided in the area of a first front side of the solenoid armature 14, has a first dipping stage 131 with a magnetic control edge 132. The second part 16 of the magnetic yoke, which is provided in the area of an opposite second front side of the solenoid armature 14, has a pole tube 161 with a second dipping stage 162. The two dipping stages 131, 162 accordingly protrude from two different front sides of the solenoid coil 12 in the armature area 146 within which the solenoid armature 14 is arranged in a movable manner. As shown, the dipping stages 131, 162 are preferably arranged in an interior space of the solenoid coil 12, which is radially enclosed by these; however, this is not mandatory. The first dipping stage 13 preferably serves at the same time as an axial stop for the solenoid armature 14 in a direction of actuation (see arrow) of the actuator 1. The pole tube 161 preferably serves at the same time as an axial stop for the solenoid armature 14 counter to the direction of actuation of the actuator 1.

The armature 14 is mounted in a manner that is axially movable along the longitudinal axis L of the actuator 1 (=axis of movement of the armature 14). For this purpose, slide bearings are provided at the end areas of the armature 14 and in the corresponding areas of the magnetic yokes 13 and 16. Other suitable bearing arrangements (for example, a single-sided bearing) and bearing types (for example, rolling bearings) are possible.

In the exemplary case that is shown, the solenoid armature 14 is designed in three parts, and includes an armature rod 141, an armature body 142 and an optional anti-adhesive disc 143 made of a non-magnetic material, such as aluminum. However, other suitable armature designs are possible (for example, a one-piece armature). The adhesive disc 143 prevents a magnetic sticking of the armature 14, if the solenoid armature 14 abuts on the front side on the magnetic yoke part 13 or the first dipping stage 131, as the case may be.

The cylinder-shaped armature 14 (here, for example, the armature body 142) includes at least one first and one second tapering 144, 145, which are crucial in generating the actuating force of the actuator 1. The second tapering 145 is formed by a transition from a maximum first radial external dimension D1, Dmax of the armature 14 (maximum external diameter) to a smaller second radial external dimension D2 of the armature 14 (second external diameter). The first tapering 144 is formed by a transition of the second radial external dimension D2 of the armature 14 to an even smaller or minimal third radial external dimension D3 of the armature 14 (minimum external diameter). The second and the first tapering 144, 145 are arranged on the armature 14 in this order in the direction of actuation of the actuator 1 (in FIG. 2, from top to bottom). In the example that is shown, both taperings 144, 145 are designed in a stepped arrangement. Alternatively, one or both of the taperings 144, 145 may also be designed in a cone shape.

The position of the armature 14 in the de-energized state of the solenoid coil 12 is predetermined by means of two spring elements 15, here indicated as pressure coil springs, within the actuator 1. A pre-stressing of the spring element 15 turned away from the magnetic yoke part 13 is adjustable in particular through a pre-stress element 19. In particular, as in the case shown, this may be pressed, whereas the pre-stressing is then adjusted depending on the impression depth, or the pre-stress element 19 may be screwed in, whereas the pre-stressing is then adjusted depending on the screw-in depth.

If applicable, solely one one-sided elastic pre-stressing of the armature 14 may also be provided, or the pre-stressing by the spring elements 15 may be entirely omitted.

There is an electric contact device 17 attached on the front side of the housing 11; this is electrically connected to the solenoid coil 12 and, through this, the solenoid coil 12 can be electrically energized by an external power supply that is not shown here. The contact device 17 may also be provided on the side of the housing 11.

As described, the magnetic yoke part 13 features the first dipping stage 131 on a front side turned towards the armature 14. Through the design of the magnetic control edge 132 of the dipping stage 131, here in the form of an external taper, there can be a precise adjustment of the size of the magnetic force acting on the armature 14 with the currently supplied electric current strength and with the current position of the armature 14 in the armature area 146. In addition, the second magnet control edge 162 is provided in the magnetic yoke part 16; this also influences the size of the magnetic force acting on the armature 14 with the currently supplied electric current and with the current position of the armature 14 in the armature area 146.

As the enlarged partial view of the dipping stage 131 at the bottom right of FIG. 1 shows, the first dipping stage 131 features, for the version with a stepped arrangement that is shown, a magnetically effective surface, which is essentially formed by a radial surface, with an inner surface aligned in a manner parallel (axial) aligned to the longitudinal axis L and an axial surface, with a surface aligned in a manner perpendicular (radial) to the longitudinal axis L. If, other than the case shown, the first dipping stage 131 is designed with a hollow cone shape, this features a hollow cone-shaped inner surface, which is oblique in respect of the longitudinal axis L. In conjunction with the first tapering 144 of the armature 14, an axial (air) gap A1 is formed between the first tapering 144 and the first dipping stage 131. Thereby, the magnetic effect of the anti-adhesive disc 143 is negligible. As soon as, upon a shifting of the armature in the direction of actuation, the tapering 144 is dipped in the dipping stage 131, as shown in the enlarged view of the first dipping stage 131, an axial covering U1 and a radial (air) gap R1 are also formed in the area of the first tapering 144 between the armature 14 and the dipping stage 131. Thereby, the magnetic flux in the axial gap A1 is essential for the actuating force of the actuator 1.

As the enlarged partial view of the second dipping stage 161 at the bottom left of FIG. 1 shows, the second dipping stage 162 at the pole tube 161 is designed in such a manner that the pole tube 161 has a hollow cylindrical shape and features a first internal dimension d1 (internal diameter), which is reduced in the area of the second tapering 162 of the armature 14 in the direction of actuation of the actuator (see arrow) to a smaller or minimal second internal dimension d2, dmin (internal diameter). Moreover, with the version with a stepped arrangement that is shown, the second dipping stage 162 has a magnetically effective surface, which is essentially formed by a radial surface, with an inner surface aligned in a manner parallel (axial) aligned to the longitudinal axis L and an axial surface, with a surface aligned in a manner perpendicular (radial) to the longitudinal axis L. If, other than the case shown, the second dipping stage 162 is designed with a hollow cone shape, this features a hollow cone-shaped inner surface, which is oblique in respect of the longitudinal axis L.

In conjunction with the second tapering 145 at the armature 14, an axial gap A2 is formed between the second tapering 145 and the second dipping stage 162 (the contour shown in dashed lines in the enlarged view of the second dipping stage 162 shows the location of the tapering 145 in a de-energized initial position of the actuator 1). As soon as, upon a shifting of the armature in the direction of actuation, the tapering 145 is dipped in the dipping stage 162 (as shown in the enlarged view of the second dipping stage 161 by continuous lines), there is no longer an effective axial gap A2. Instead of this, an axial covering U2 along with a radial (air) gap R2 is formed in the area of the tapering 145 between the armature 14 and the dipping stage 162, and/or the radial gap R2 is then minimized. The larger the axial covering U2 and the smaller the radial gap R2, the greater is the magnetic flux existing between the armature 14 and the magnetic yoke part 16 in the area of the second tapering 144 upon a power supply of the solenoid coil 12, by which a larger magnetic flux in the area of the dipping stage 131 is also generated, and thus the actuating force of the actuator 1 is increased.

The taperings 144, 145 and the dipping stages 131, 162 are arranged in such a manner that, upon a shifting of the armature 14 in the direction of actuation (see arrow), the second tapering 145 is initially dipped in the second dipping stage 162, and the first tapering 144 is then dipped in the first dipping stage 131. This brings about a smooth and relatively early-stage progressive course of the actuating force path characteristic curve of the actuator 1. Thereby, regarding the second dipping stage 162 and the tapering 145, the first dipping stage 131 and the tapering 144 are arranged in the direction of movement (see arrow) of the actuator 1 on the armature 14 and/or the magnetic yoke part 13 (FIG. 2, from top to bottom).

An actuating means 2 is provided for tapping the actuating force of the actuator 1 and protrudes from the actuator 1, here, for example, designed as a fixed rod. The actuating means 2 is securely connected to the armature 14, or abuts on one front side of the armature 14 lying in the direction of actuation (see arrow), such that it can transfer the actuating force to the actuating means 2 in the direction of actuation. In the case that is shown, upon an electric power supply of the solenoid coil 12, the actuator 1 generates a compressive force in the direction of actuation (see arrow), which is thus transmitted to the actuating means 2. As a basic principle, the actuating means 2 may also form a part of the armature 14. The actuating means 2 may also be firmly connected to an opposite front side of the armature 14, or abut on such side, and protrude on such opposite side from the actuator 1 (i.e., shown upwards in FIG. 1, rather than shown downwards in FIG. 1). At that point, the actuator 1 generates a tractive force in the direction of actuation, which is transferred to the actuating means 2.

Of course, the actuating means 2 designed as a rod is understood only as symbolic for every other suitably designed actuating means, by which the actuating force of the armature 14, thus the actuator 1, is able to be tapped. Thereby, this may also be a chain, a rope, a cylinder, a hook, etc.

Figure 2:
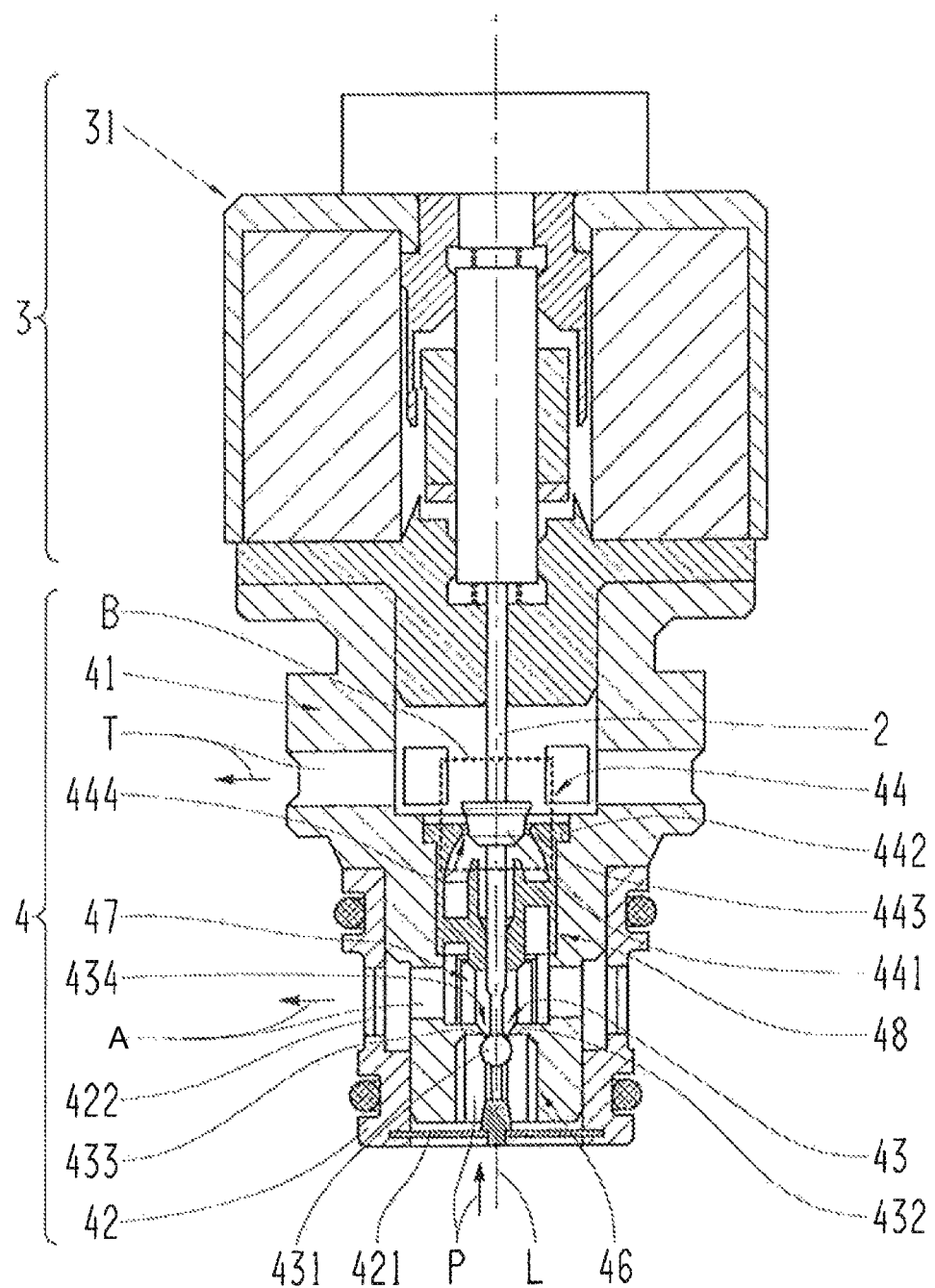
FIG. 2 a two-dimensional longitudinal section through a proposed fluid valve.

FIG. 2 shows a longitudinal section through a fluid valve. The fluid valve essentially consists of an electromagnet part 3, i.e. an electromagnetic actuator, and a valve part 4, the housings 31, 41 of which are preferably firmly connected to each other. The electromagnet part 3 is in particular formed through the electromagnetic actuator 1 shown in FIG. 1 (see left side of the electromagnet part 3). However, it should be noted that other types of electromagnet parts 3 are able to be used (see right side of the electromagnet part 3), for example, the electromagnet part disclosed in FIG. 1 of DE 102 55 414 A1.

The functioning of the electromagnet part 3 is known from the previous explanations, which is why it is not addressed again here. The version of the electromagnet part 3 shown on the right side of FIG. 2 does not have the second tapering and dipping stage. Instead, this concerns a conventional proportional solenoid.

Attached to the front side of the electromagnet part 3, the fluid valve has the valve part 4. This features a filter cage 42 fitted on the housing 41, with a first filter 421 on the side of the inlet, found on the front side of the fluid valve, and a second filter 422 on the side of the outlet, arranged on the side of the fluid valve. However, the filter 421, 422 or the filter cage 42 may also be omitted. Seals that separate one inlet area, one first outlet area and one second outlet area of the fluid valve from each other in a fluid-tight manner are arranged on the filter cage 42. The inlet area P, also called a pressure supply connection, is arranged on an axial front side of the fluid valve, while the first outlet area A, also called a working pressure connection, and the second outlet area T, also called a tank connection, are arranged radially to the longitudinal axis L. Corresponding valve openings P, T, A, through which fluid may flow in or out of the valve, are allocated to the areas P, T, A. Specifically, these are the inlet opening P, the first outlet opening A and the second outlet opening T.

However, through a corresponding suitable channel guide within the valve part 4, the arrangement of the inlet area P and the first and second outlet area A and T, and/or their valve openings, may also be interchanged among such areas. A preferred direction of flow of the fluid into the inlet area P and from the first and the second outlet area A, T is indicated by arrows.

In the interior of the housing 41, the valve part 4 features a first part valve 43 and a second part valve 44, through which the areas and/or corresponding valve openings P, A and T are connected to each other in terms of flow engineering. This means, by opening or closing the part valves 43, 44 a connection between the inlet opening P and the outlet openings A, T, and between the outlet openings A, T among each other, can be produced, such that fluid is able to flow through the valve through the valve openings P, A, T. By doing this, the pressure level at the outlet opening A of the first outlet area may be selectively adjusted.

Since the fluid flowing through the second part valve 44 is led into a fluid reservoir, generally without being used, the fluid quantity flowing through the second part valve 44 is frequently called leakage. The outlet opening T of the second outlet area is interconnected in a manner that is mostly pressure-free, thus applied with an atmospheric ambient pressure (usually, normal air pressure of the environment).

In the embodiment that is shown, the part valves 43, 44 are formed as poppet valves. The first part valve 43 features a closing body 431 movable along a longitudinal axis of the first part valve 43, in the case that is shown in the form of a cone. The second part valve 44 also features a closing body 441 movable along a longitudinal axis of the second part valve 44, which is designed in a cone shape. Here, the longitudinal axes or axes of motion of the part valves 43, 44 correspond to the longitudinal axis L of the fluid valve, which in all other respects also corresponds to the longitudinal axis of the electromagnet part 3. However, through using suitable means of deflection, the longitudinal axes or axes of motion of the part valves 43, 44 and the electromagnet part 3 may also vary to each other, and may lie, for example, parallel, bent or skewed to each other.

The counterpart to the closing body 431 of the first part valve 43 forms a valve orifice 432. This features a control edge 433 (=valve seat), on which the closing body 431 in the closed state abuts, by which the first part valve 43, specifically a valve opening 434 of the first part valve 43, is closed in a manner that is largely fluid-tight. A first effective valve opening area formed between the closing body 431 and the control edge 433 upon the opening of the first part valve 43 is thereby determined by the fluid quantity flowing through the first part valve 43 into the fluid valve and a pressure drop at the first part valve 43. Thus, the fluid pressure applying at the valve opening A of the first outlet area and/or able to be tapped there is affected.

The counterpart of the closing body 441 of the second part valve 44 likewise forms a valve orifice 442, which however features a hollow cone-shaped control surface 443 (=valve seat) instead of a control edge. The closing body 441 lies flat on the control surface 443, if the second part valve 44 is closed, by which the second part valve 44, specifically a valve opening 444 of the second valve part 44, is closed in a manner that is largely fluid-tight. A second effective valve opening area formed between the closing body 441 and the control surface 443 upon the opening of the second part valve 44 is determined by the fluid quantity flowing out of the second part valve 44. Thus, the second part valve 44 determines the quantity of the fluid flowing between the outlet opening A of the first outlet area and the outlet opening T of the second outlet area. Thereby, the fluid pressure applying at the outlet opening A of the first outlet area and/or able to be tapped there is likewise affected.

As may be derived from FIG. 2, the closing body 441 of the second part valve 44 is cone-shaped and provided with several taper areas, which have taper angles that are different from each other (here, as an example, a total of three taper areas). The corresponding valve seat, i.e. the control surface 443, is designed in such a manner that the closing body 441 solely abuts precisely on one of the multiple taper areas, when the second part valve 44 is closed.

In the configuration of the fluid valve that is shown, the closing body 431 of the first part valve 43 is arranged upstream of the corresponding valve opening 434, and the closing body 441 of the second part valve 44 is arranged downstream of the corresponding valve opening 444.

It is thereby clear that the first part valve 43, specifically the closing body 431 and the corresponding valve orifice 432, may be designed as any suitable type. In particular, the first part valve 43 may be designed as a flat poppet valve or as a cone poppet valve, for example analogously to the second part valve 44 that is shown, or as a slide valve.

In the case that is shown, the first part valve 43 features a control edge 433, on which the closing body 431 abuts in line-shaped form in a closed state (i.e., there is one essentially linear contact between the closing body 431 and the valve orifice 432), while the second part valve 44 features a control surface 443, on which the closing body 441 lies flat in a closed state (i.e., there is one essentially laminar contact between the closing body 441 and the valve orifice 442). However, it is clear that the part valves 43, 44 may also be designed in such a manner that both or only one of the two part valves 43, 44 feature a laminar contact or a linear contact between the closing bodies 431, 441 and the valve orifices 432, 442. To generate a flat contact, the respective valve orifice 432, 442 has a control surface complementing the surface shape of the closing bodies 431, 441, and, to show a linear contact, the valve orifice 432, 442 has a control edge complementing the surface shape of the closing bodies 431, 441.

The closing bodies 431, 441 of the part valves 43, 44 are mechanically coupled through the actuating means 2 movable along the longitudinal axis L, here in the form of a bar. The actuating means 2 is used for the actuation (i.e., the opening and closing) of the part valves 43, 44. In the version that is shown, at least the closing body 441 of the second poppet valve 44 is connected to the actuating means 2. This connection may be realized in both fixed form (as shown) and flexibly through an intermediate elastic element, such as a pressure spring between the closing body 441 and the actuating means 2. The closing body 431 may be either likewise connected to the actuating means 2 (in fixed form or flexibly), or separated from the actuating means 2 in such a manner that, for opening the first poppet valve 43, this pushes away the closing body 431, and thus releases the valve opening 434. Thus, the part valves 43, 44 are mechanically coupled, even in the latter case, since the actuating means 2 mechanically opens at least both.

With a closing body 431 that is loose in respect of the actuating means 2, the closing of the first poppet valve 43 occurs through the pressure of the fluid flowing from the inlet opening P of the inlet area, as soon as the actuating means 2 is moved away from the closing body 431.

Through the actuating means 2, the closing bodies 431, 441 are coupled with each other in such a manner that the part valves 43, 44 are actuated alternately. This means, on the one hand, that if the first part valve 43 is open, the second part valve 44 is closed, and, on the other hand, that if the first part valve 43 is closed, the second part valve 44 is open. Thus, the arrangement and coupling of the part valve 43, 44 correspond to a hydraulic half-bridge circuit.

A shifting of the actuating means 2 in the direction of actuation of the electromagnet part 3 brings about an opening of the first part valve 43 and a simultaneous closing of the second part valve 44. Essentially, a spring force of the spring element of the electromagnet part 3 lying in the direction of the valve part 2 and a fluid pressure force acting on the closing body 431 thereby bring about, with increasing deflection of the actuating means 2, an increasing counteracting force against the actuating force of the electromagnet part 3. Thus, the first part valve 43 opens only up to the point, or the second part valve 44 closes only up to the point, that a balance of forces is reached between the actuating force and the counteracting force. Thereby, depending on the opening widths of the part valves 43, 44 in the outlet opening A of the first outlet area, a certain fluid pressure arises, which is below the fluid pressure applying at the inlet opening P of the inlet area, and is above the fluid pressure applying at the outlet opening T of the second outlet area.

Thereby, as a general rule, the fluid pressure in the outlet area T corresponds to, as described, the ambient pressure or the surrounding atmospheric pressure, since the outlet opening T of the second outlet area is usually connected to a fluid reservoir existing under atmospheric surrounding pressure. Since the actuating force generated by means of the electromagnet part 3 depends on the strength of the electric power that is supplied, and the counteracting force depends on the deflection of the actuating means 2, the pressure level at the outlet opening A of the first outlet area can thus be adjusted very precisely based on the electric power that is supplied.

It should be noted that the switching positions of the electromagnet part 3 of the valve part 4 shown in FIG. 2 correspond to a middle position of the fluid valve, in which the electromagnet part 3 is electrically energized, and therefore this produces a certain actuating force on the actuating means 2 in the direction of the valve part 4. However, the current strength used for the power supply does not thereby correspond to a maximum current strength. Accordingly, the part valves 43, 44 are open only to approximately 50%. In a de-energized state, no actuating force is produced by the electromagnet part 3, and the first part valve 43 is fully closed and the second part valve 44 is fully open. Thus, no fluid is then able to flow through the pressure control valve device from the inlet opening P (the pressure is set at the first outlet area A, thus to the value of "0" or to the atmospheric pressure). Therefore, the fluid valve shown in FIG. 2 is normally-closed (normally-low), which corresponds to an increasing p/I valve characteristic curve. This means that, with the increasing strength of the electric power supplied to the electromagnet part 3, the actuating force generated by this increases, by which the first part valve 43 opens and the second part valve 44 closes. Thus, the fluid pressure that is able to be tapped at the first outlet opening A then increases. Therefore, the direction of actuation of the electromagnet part 3 is oriented in the direction of the valve part 4 (downwards in FIG. 2).

However, the fluid valve may be redesigned in such a manner that it is normally-open (normally-high), which corresponds to a decreasing p/I characteristic curve. Thereby, in the de-energized initial state, the first part valve 43 is fully open and the second part valve 44 is fully closed, by which fluid may flow from the inlet opening P exclusively to the first outlet opening A, and thus apply a maximum fluid pressure. With an increasing electrical power supply of the electromagnet part 3, the first part valve 43 is closed and the second part valve 44 is open, and fluid pressure that is able to be tapped at the first outlet area P decreases accordingly. For this purpose, the first and second part valve 43, 44 are reconfigured in such a manner that, on the one hand, the closing body 431 and the corresponding control edge 433 of the first part valve 43 is arranged downstream of the valve opening 434, and, on the other hand, the closing body 441 and the corresponding control surface 443 of the second part valve 44 is arranged upstream of the valve opening 444. In addition, the electromagnet part 3 must be reconfigured in such a manner that its direction of actuation is directed away from the valve part 4 (upwards in FIG. 2).

In accordance with FIG. 2, a first flow control device is arranged on the inlet side, i.e. upstream, of the first part valve 43 in the inlet area, which imprints a swirl on the fluid flowing into the area of the first part valve 43. This is to be understood such that the first part valve 43 rotates fluid particles that are flowing through around the longitudinal axis L, thus forming a vortex around the longitudinal axis L. Thereby, a resistance to excitations or disruptions in the fluid flow, such as in the case of pressure fluctuations of the fluid flowing to the fluid valve, can be achieved.

The first flow control device 46 is optional; i.e., instead of this, an inlet opening, which does not imprint special flowing characteristics on the fluid that is flowing, can be provided. For example, the inlet opening P of the inlet area may be a normal hole or the like.

After flowing through the first part valve 43, the fluid arrives in a gap 47, where the flow of fluid is divided into a first partial flow to the first outlet area A and a second partial flow to the second part valve 44 for the second outlet area T, provided that the second part valve 44 is at least partially open. Thus, the proportion of the first and second partial flow is determined by the opening width of the second part valve 44, specifically through the effective valve opening area of the second part valve 44.

Several radial outlet openings A of the first outlet area are provided in the housing 41 of the valve part 4, for the outflow of the first partial flow. In addition, several radial outlet openings T of the second outlet area are provided in the housing 41, for the outflow of the second partial flow. However, it is sufficient to provide only one outlet opening A, T. In addition, the outlet openings A, T may, depending on the channel guide in the housing 41, also axially overflow from this.

As shown in FIG. 2, it is likewise optional to provide a second flow control device 48 in the gap 47 upstream of the second part valve 44, in terms of flow engineering between the first and second outlet area A, T. This is designed in such a manner that the fluid flowing to the second outlet area T, i.e. the second partial flow, is brought into a swirl around the longitudinal axis L in the area of the second part valve 44. Thereby, the leakage of the fluid valve can be reduced, and the valve dynamics can be increased.

Preferably, but not necessarily, the flow control devices 46, 48 are designed as shown in such a manner that the swirls of the fluid flows that they generate have the same direction of rotation. Thus, the direction of rotation of the fluid flow flowing through the first part valve 43 and the direction of rotation of the fluid flow flowing through the second part valve 44 are equal. This further increases the oscillation stability of the fluid valve.

Figure 3A:
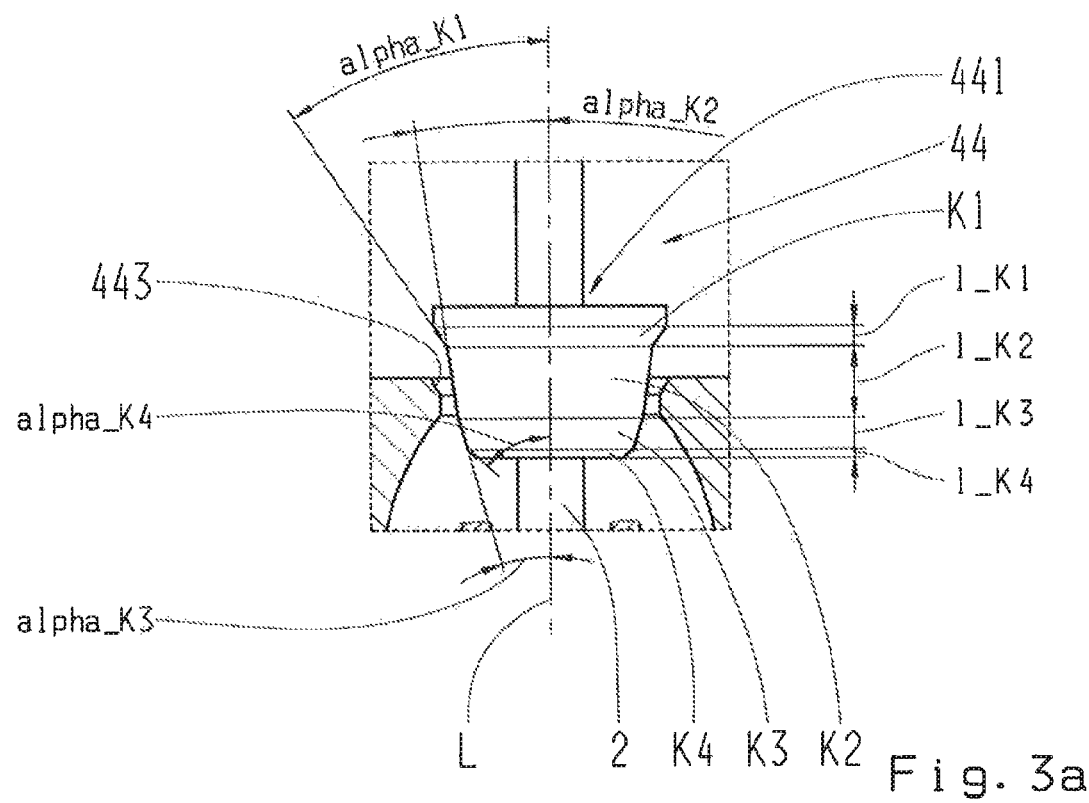
FIG. 3a, b in each case, an enlarged image of a section from FIG. 2 with an alternative version of the second poppet valve.
Figure 3B:
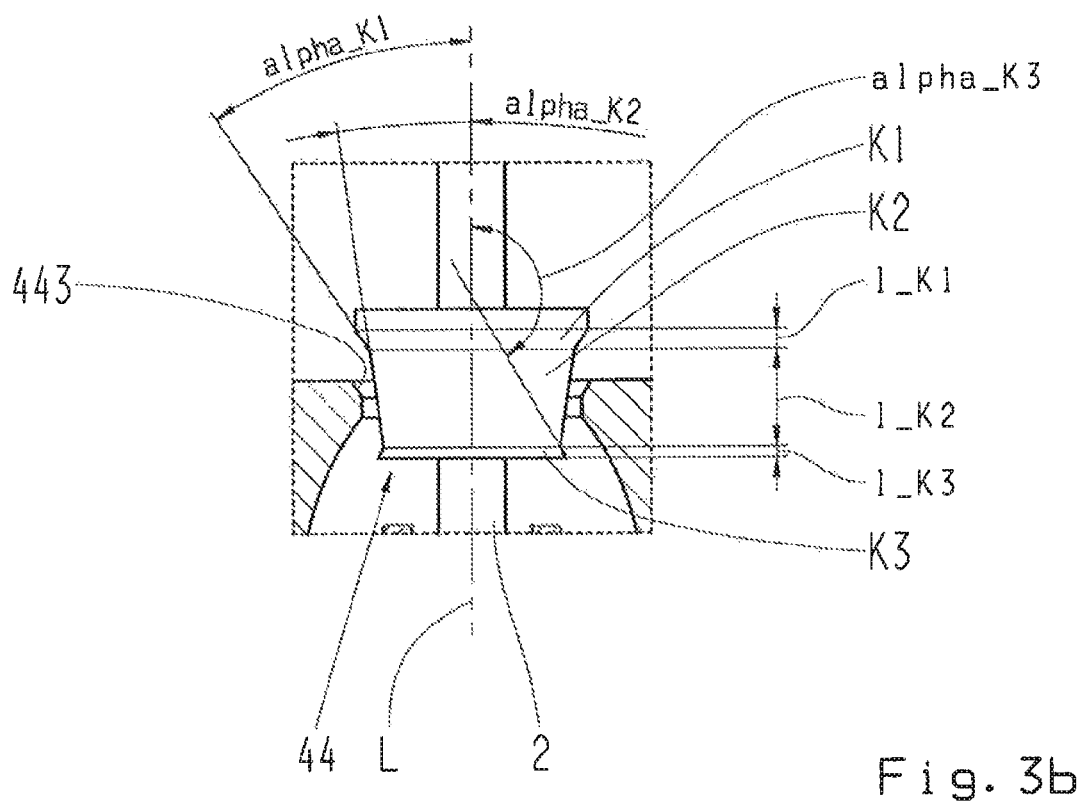

FIGS. 3a and 3b respectively show an enlargement of section B of FIG. 2, whereas in each case different arrangements of the closing body 441 of the second part valve 44 are shown. As described, the closing body 441 of the second part valve 44 is designed in a cone shape, with several taper areas K1 to K4, which have different taper angles alpha_K1 to alpha_K4.

The closing body 441 in accordance with FIG. 3a features a total of four taper areas K1 to K4, each of which has different taper angles alpha_K1 to alpha_K4 and optionally different axial lengths l_K1 to l_K4. However, instead of four, fewer taper areas (such as two or three) may also be provided. However, more than four taper areas (such as five, six or seven) may also be provided.

The taper angles alpha_k1 to alpha_K4 are the angles by which the lateral surface of the respective taper areas K1 to K4 are inclined in respect of the actuation axis of the part valve, thus the longitudinal axis L. A direction of closing is that direction in which the closing body 44 must be shifted so that the part valve 44 closes, while an opening direction is that direction in which the closing body 44 must be shifted so that the part valve 44 opens. An acute taper angle)(<90° alpha_K1 to alpha_K4 is present if the closing body 441 in the corresponding taper areas K1 to K4 tapers in the direction of closing, while an obtuse taper angle)(>90° alpha_K1 to alpha_K4 is present if the closing body 441 in the corresponding taper areas K1 to K4 is expanded in the direction of closing (see, for example, FIG. 3b, taper area K3). In particular, an angle that is not 0° and not 90° is understood to be a taper angle alpha_K1 to alpha_K4.

In the embodiment shown in FIG. 3a, a first axial front side of the closing body 441 is attached to a cylindrical area directly in the direction of closing. This is then attached, in the direction of closing, directly to the first, then the second, then the third and then the fourth taper areas K1 to K4. Lastly, a second axial front side of the closing body 441 attaches directly to the fourth taper areas K4. The taper angles alpha_K1 to alpha_K4 are thus chosen in such a manner that the closing body 441 increasingly tapers with each of the four taper areas K1 to K4. Therefore, the taper angles alpha_K1 to alpha_K4 are acute. Therefore, the external diameter of the closing body 441 on the first axial front side is its maximum external diameter, while the external diameter of the closing body 441 on the second front side is its minimum external diameter. It can thereby be provided that a cylindrical section is provided between two taper areas K1 to K4. It can also be provided that one or more of the taper areas K1 to K4 feature an obtuse taper angle alpha_K1 to alpha_K4, and the closing body 441 thus expands there in the direction of closing.

In a closed position, the closing body 441 lies flat, solely with the first taper area K1, on the corresponding hollow cone-shaped control surface 443 (poppet valve) of the second part valve 44. However, it can also be provided that several of the taper areas K1 to K4 abut on the control surface 443. In this case, the control surface 443 has multiple hollow cone-shaped areas that correspond to the taper areas of the closing body 441 abutting thereon.

According to the embodiment of FIG. 3b, the closing body 441 has solely three taper areas K1 to K3, with different taper angles alpha_K1 to alpha_K3. Thereby, the third taper area K3 features an obtuse taper angle alpha_K3. In addition, in FIG. 3b, the second taper area K2 has a taper angle alpha_K2 that is different from that in FIG. 3a. Moreover, the axial lengths l_K2, l_K3 of the taper area K2, K3 are different from those in FIG. 3a.

In particular, by providing a taper area with an obtuse taper angle on the front side of the closing element 441 in the direction of closing, as shown in FIG. 3b, the leakage of the fluid valve is reduced. This is due to the fact that such an expansion of the closing element 441 in the direction of closing represents a certain flow obstruction, which makes flowing through the second poppet valve 44 difficult. The lateral surface of the closing element 441 thereby has a concave shape.

It should be noted that the taper areas K1 to K4 must, as shown, not merge in a rough manner. This means that the edges or bends formed between the taper areas K1 to K4 may be at least partially smoothed, such as through radii or transitions that are otherwise smooth. This creates a smooth transition that is favorable for the flow between at least two of the taper areas K1 to K2. Turbulence at the edges or bends, which adversely affect the oscillation properties of the fluid valve, is thus reduced. It can also be provided that two taper areas K1 to K4 that are not directly adjacent feature the same taper angles alpha_K1 to alpha_K4.

Through the different taper areas K1 to K4, a non-proportional change to the pressure drop at the second part valve 44 in respect of the travel path of the closing body 441 and to the fluid quantity flowing through the second part valve 44 is brought about. With a conventional cone poppet valve, for which the closing element features a single taper area, a valve gap between the closing element and the valve seat opens to the extent (proportionally) that the closing element is increased by a travel path of the valve seat. By providing multiple taper areas with different taper angles, the radial valve gap that is now released no longer changes proportionally to the travel path of the closing element; rather, it also changes in a manner corresponding to the selected form of the lateral surface of the closing element.

With a suitable version of the taper areas K1 to K4, for example, in accordance with FIG. 3a or 3b, this may achieve a progressive p/I characteristic curve at a fluid valve.

Figure 4:
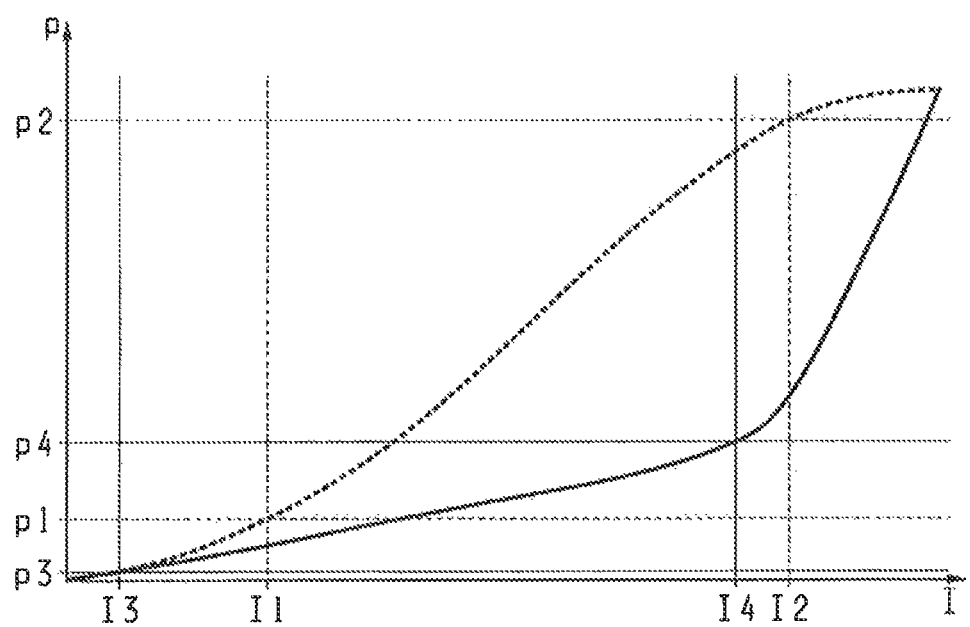
FIG. 4 p/I characteristic curves of fluid valves.

FIG. 4 shows p/I characteristic curves of a conventional electromagnetically actuated proportional fluid valve (proportional p/I characteristic curve) and a progressive electromagnetically actuated fluid valve (progressive p/I characteristic curve). The p/I characteristic curve of the proportional fluid valve is shown as a dotted curve, while the progressive fluid valve is shown as a continuous curve. The electric current I, which is led through the electromagnet part (electromagnetic actuator) of the respective fluid valve, is identified with I and plotted on the x-axis. The fluid pressure (working pressure), which then adjusts to the applied electric current I at a first outlet opening of the fluid valve, is identified with p and plotted on the y-axis.

With a conventional proportional fluid valve (characteristic curve shown in dashed lines), an essentially proportional fluid pressure, which is located between p1 and p2, arises in the operating area of the valve, which exists between the currents I1 and I2. Therefore, in the operating area, the fluid pressure p arising at the first outlet opening of the fluid valve is essentially proportional to the applied electric current I. Outside of the operating area between I1 and I2, the characteristic curve is flattened, and there is no proportionality between the fluid pressure p and the electric current I.

With the progressive fluid valve (continuously shown characteristic curve), in a first operating area, which is between the electric currents I3 and I4, there is a proportionality for the applied fluid pressure p, the value of which amounts to between p3 and p4. Therefore, in this first operating area, the fluid pressure p arising at the first outlet opening of the fluid valve is essentially proportional to the electric current I. In a second operating area, which is present from the electric current I4, the characteristic curve increases with a strong progression. The end pressure at the right end of the characteristic curve that is shown thereby corresponds to the end pressure of a conventional proportional fluid valve. As such, both valves can release the same end pressure. The p/I characteristic curve shown in FIG. 4 of the progressive fluid valve essentially corresponds to that of the valve in FIG. 2.

It is clear that the slope of the characteristic curve of a conventional proportional fluid valve between I1 and I4, or p1 and p2, is clearly steeper compared to the characteristic curve of the progressive fluid valve between I3 and I4, or p3 and p4. With a steep p/I characteristic curve, small changes to the electric current I produce relatively large changes to the applied fluid pressure p. Therefore, such a valve is more controllable, as power fluctuations that may occur in any electrical network strongly affect the fluid pressure p. However, with a progressive fluid valve, power fluctuations in the area between I3 and I4 have only slight effects on the fluid pressure p, as its p/I characteristic curve in this area features a clearly lower slope. Therefore, in particular, the setting of low pressure, as this is needed (for example) for the sensitive actuation of a shifting element of an automatic vehicle transmission, can be simplified by such a progressive fluid valve. In addition, high pressure may then continue to be provided through the fluid valve, in order to keep the shifting element securely closed.

Therefore, in particular, the fluid valve is preferably used in an automatic vehicle transmission for the actuation of shifting elements of the transmission. By means of such a shifting element, which may in all other respects be a clutch or a brake in particular, transmission stages are engaged or disengaged, as the case may be.

Modifications and variations can be made to the embodiments illustrated or described herein without departing from the scope and spirit of the invention as set forth in the appended claims.

The invention claimed is:

1. An electromagnetic actuator for actuation of a pressure control fluid valve in a vehicle transmission, comprising:
   a solenoid coil;
   an armature magnetically moved by the solenoid coil in an armature area, the armature comprising a first tapering at a first end thereof, and a second tapering at an opposite second end thereof;
   a magnetic yoke having a first dipping stage into which the first tapering moves upon a shifting of the armature in an actuation direction, and a second dipping stage into which the second tapering moves upon a shifting of the armature in the actuation direction, the magnetic yoke having a continuous magnetic path that includes the first dipping stage and the second dipping stage;
   the first dipping stage extending from the solenoid coil into the armature area and operating with the first tapering upon supply of power to the solenoid coil to contribute to an actuating force of the electromagnetic actuator;

the second dipping stage extending from the solenoid coil into the armature area and operating with the second tapering upon supply of power to the solenoid coil to contribute to the actuating force of the electromagnetic actuator; and the armature having a maximum external radial dimension D1 that is reduced at the second tapering to a dimension D2, and at the first tapering the dimension D2 is reduced to a minimum dimension D3 of the armature.

2. The electromagnetic actuator as in claim 1, wherein the first and second taperings are defined in one of a stepped configuration or a cone-shaped configuration.

3. The electromagnetic actuator as in claim 1, wherein the first and second dipping stages are arranged such that, upon movement in an actuation direction, the second tapering of the armature moves initially into the second dipping stage before the first tapering moves into the first dipping stage, and upon further movement in the actuation direction, the first and second taperings are moved deeper into the first and second dipping stages, respectively.

4. The electromagnetic actuator as in claim 1, wherein the armature is cylinder-shaped, the second dipping stage having a hollow cylinder-shape with an internal diameter that is greater than a maximum external diameter D1 of the armature at the second tapering.

5. The electromagnetic actuator as in claim 4, wherein a radial gap is defined between the second tapering at the maximum external diameter and the second dipping stage when the second tapering is moved axially into the second dipping stage.

6. The electromagnetic actuator as in claim 5, wherein the second dipping stage is located within an interior space radially enclosed by the solenoid coil.

7. The electromagnetic actuator as in claim 6, wherein the second dipping stage is formed as a pole tube that extends axially in the interior space radially enclosed by the solenoid coil.

8. A fluid pressure control valve having an electromagnetic actuator in accordance with claim 1, the fluid pressure control valve further comprising:

an inlet opening;

a first outlet opening, and a second outlet opening, the first and second outlet openings in fluid flow communication;

a first adjustable part valve and a second adjustable part valve, the first and second adjustable part valves mechanically coupled to each other; and the first adjustable part valve disposed to adjust fluid intake through the inlet opening to the first and second outlet openings, and the second adjustable part valve disposed to adjust fluid discharge between the first and second outlet openings.

9. The fluid pressure control valve as in claim 8, wherein the second part valve comprises a poppet valve with a cone-shaped closing element having a plurality of taper areas of varying taper angles.

10. The fluid pressure control fluid valve as in claim 9, wherein the second part valve further comprises a cone-shaped valve seat, and wherein in a closed state of the second part valve, less than all of the taper areas seat flat against the valve seat.

11. The fluid pressure control fluid valve as in claim 10, wherein at least one of the taper areas comprises an acute taper angle, and at least one other of the taper areas comprises an obtuse taper angle.

* * * * *